US012791972B2

(12) United States Patent
Yamamoto

(10) Patent No.: US 12,791,972 B2
(45) Date of Patent: Nov. 10, 2026

(54) SHEET CONVEYING DEVICE AND IMAGE FORMING APPARATUS

(71) Applicant: Kazuya Yamamoto, Kanagawa (JP)

(72) Inventor: Kazuya Yamamoto, Kanagawa (JP)

(73) Assignee: ETRIA CO., LTD., Kanagawa (JP)

( * ) Notice: Subject to any disclaimer, the term of this patent is extended or adjusted under 35 U.S.C. 154(b) by 0 days.

(21) Appl. No.: 19/450,207

(22) Filed: Jan. 15, 2026

(65) Prior Publication Data

US 2026/0252017 A1 Aug. 27, 2026

(30) Foreign Application Priority Data

Feb. 26, 2025 (JP) ................................ 2025-028704

(51) Int. Cl.
*G03G 15/00* (2006.01)
*B65H 3/68* (2006.01)

(52) U.S. Cl.
CPC ........... *G03G 15/6529* (2013.01); *B65H 3/68* (2013.01); *G03G 15/6514* (2013.01); *B65H 2301/442* (2013.01); *B65H 2404/511* (2013.01); *B65H 2404/5213* (2013.01);
(Continued)

(58) Field of Classification Search
CPC ........... G03G 15/6529; G03G 15/6502; G03G 15/6514; G03G 2215/00392; G03G 2215/00396; G03G 2215/004; G03G 2215/00675; G03G 2215/00679; B65H 3/06; B65H 3/46; B65H 3/66; B65H 3/68; B65H 2301/44; B65H 2301/442;
(Continued)

(56) References Cited

U.S. PATENT DOCUMENTS

2010/0207323 A1* 8/2010 Kumeta .................. B65H 5/38 271/264
2010/0301550 A1* 12/2010 Muratani ................ B65H 7/06 271/264
2015/0239687 A1 8/2015 Shinkawa et al.
(Continued)

FOREIGN PATENT DOCUMENTS

EP 2769945 A2 * 8/2014 ......... G03G 15/6514
JP H03-223047 A 10/1991
JP 2010-202370 A 9/2010

OTHER PUBLICATIONS

U.S. Appl. No. 19/180,562, filed Apr. 16, 2025.

*Primary Examiner* — Benjamin R Schmitt
(74) *Attorney, Agent, or Firm* — Harness, Dickey & Pierce, P.L.C.

(57) ABSTRACT

A sheet conveying device includes a conveyor that conveys a sheet in a conveyance path in a conveyance direction, and a guide that guides the sheet in the conveyance direction, and has a reference guide face that extends along the conveyance direction, and a concave that is recessed away from the conveyance path to the reference guide face in a retraction direction, and has a vertex, an inner corner, and an incline face pair. The vertex is a most recessed portion in the concave in the retraction direction. The inner corner extends from the vertex to the reference guide face in the conveyance direction. The inclined face pair includes faces sandwiching the inner corner, and is inclined from the inner corner in the conveyance direction toward the reference guide face and outward in a width direction to a plane of the reference guide face, to the reference guide face.

16 Claims, 8 Drawing Sheets

(52) U.S. Cl.
CPC ................. *G03G 2215/004* (2013.01); *G03G 2215/00675* (2013.01); *G03G 2215/00679* (2013.01)

(58) Field of Classification Search
CPC .......... B65H 2404/50; B65H 2404/511; B65H 2404/5213
See application file for complete search history.

(56) References Cited

U.S. PATENT DOCUMENTS

| | | | |
|---|---|---|---|
| 2016/0103410 | A1 | 4/2016 | Yamamoto |
| 2021/0214176 | A1 | 7/2021 | Fukushima et al. |
| 2021/0221636 | A1 | 7/2021 | Wakabayashi et al. |
| 2022/0382201 | A1 * | 12/2022 | Imaizumi ........... H04N 1/00037 |
| 2024/0051775 | A1 | 2/2024 | Yamamoto |
| 2024/0345528 | A1 | 10/2024 | Yamamoto |

* cited by examiner

SHEET CONVEYING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2025-028704, filed on Feb. 26, 2025, in the Japan Patent Office, the entire disclosure of which is hereby incorporated by reference herein.

BACKGROUND

Technical Field

Embodiments of the present disclosure relate to a sheet conveying device that conveys a sheet such as a paper sheet, and an image forming apparatus, such as a copier, a printer, a facsimile machine, or a multifunction peripheral (MFP) including at least two functions of the copier, printer, and facsimile machine, incorporating the sheet conveying device.

Related Art

In the related art, sheet conveying devices included in image forming apparatuses such as copiers, printers, and printing machines are known that include a guide (conveyance guide plate) to guide a sheet that is conveyed by a conveyor such as a sheet roller, toward downstream in a sheet conveyance direction.

A sheet conveying device in the art employs a technique to prevent a failure in which a paper curl occurs in a sheet conveyed by a sheet feed roller (conveyor) from an upstream device, which results in a jam (paper jam) to the sheet, at the position of a guide. In order to prevent the failure, the sheet conveying device with the technique causes the sheet roller to rotate in the forward and reverse directions to contact the curled part of the sheet to the guide or causes a curl correction lever (decurl lever) to slide on the curled part of the sheet at the speed faster than the sheet conveyance speed.

In typical sheet conveying devices, when a wave is generated at the leading end of a sheet conveyed by a conveyor, the wave portion in the sheet (wave portion) climbs over a guide or buckles, resulting in a paper jam.

In contrast, it is conceivable to apply the technique employed in a sheet conveying device in the art to make the sheet conveyance direction of a sheet by a conveyor change in the forward and reverse directions or to install a correction lever (decurl lever) to straighten (decurl) the wavy portion of the sheet. However, in that case, an inconvenience (failure) may occur that complicate control and configuration, decrease the productivity of sheet feeding, and result in the increase in size and high costs of the equipment.

SUMMARY

Embodiments of the present disclosure described herein provide a novel sheet conveying device including a conveyor and a guide. The conveyor conveys a sheet in a conveyance path in a conveyance direction. The guide guides the sheet conveyed by the conveyor in the conveyance direction. The guide has a reference guide face and a concave. The reference guide face extends along the conveyance direction. The concave is recessed away from the conveyance path with respect to the reference guide face in a retraction direction intersecting the conveyance direction. The concave has a vertex, an inner corner, and an incline face pair. The vertex is a most recessed portion in the concave in the retraction direction. The inner corner extends from the vertex to the reference guide face in the conveyance direction. The inclined face pair includes faces sandwiching the inner corner. The inclined face pair is inclined from the inner corner in the conveyance direction toward the reference guide face, and inclined outward in a width direction orthogonal to the conveyance direction and intersecting to the retraction direction with respect to a plane of the reference guide face, and connected to the reference guide face.

Further, embodiments of the present disclosure described herein provide an image forming apparatus including the above-described sheet conveying device.

Further, embodiments of the present disclosure described herein provide a sheet conveying device including a conveyor and a guide. The conveyor conveys a sheet in a conveyance path in a conveyance direction. The guide guides the sheet conveyed by the conveyor in the conveyance direction. The guide has a reference guide face, and a concave. The reference guide face extending along the conveyance direction. The concave is recessed away from the conveyance path with respect to the reference guide face in a retraction direction intersecting the conveyance direction. The concave has a vertex and an inclined face pair. The vertex is a most recessed portion in the concave in the retraction direction. The inclined face pair includes faces sandwiching the vertex. The inclined face pair is inclined in the conveyance direction, and inclined outward in a width direction orthogonal to the conveyance direction with respect to a plane of the reference guide face, and connected to the reference guide face.

Further, embodiments of the present disclosure described herein provide an image forming apparatus including the above-described sheet conveying device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
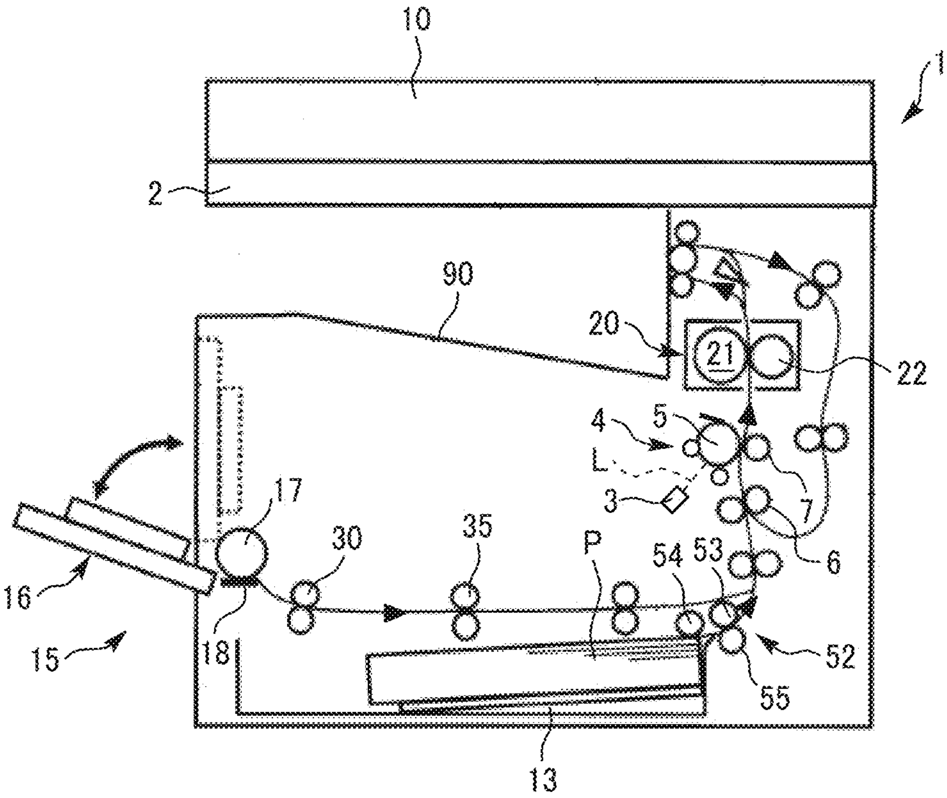
FIG. 1 is a diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the present disclosure are described below with reference to the drawings. The same reference numerals are given to identical or corresponding constituent elements such as parts and members having the same reference numerals, and redundant descriptions thereof are omitted unless otherwise required.

Initially with reference to FIG. 1, a description is given of the overall configuration and operation of an image forming apparatus 1 according to an embodiment of the present disclosure.

FIG. 1 is a diagram illustrating an overall configuration of an image forming apparatus according to an embodiment of the present disclosure.

In FIG. 1, the image forming apparatus 1, which is a copier in the present embodiment, includes a document reading device 2, an exposure device 3, an image forming device 4, a transfer device 7 serving as an image forming unit, a document feeding device 10, a sheet tray 13, a bypass sheet feeding device 15, a fixing device 20, a fixing roller 21, a pressure roller 22, conveyance roller pairs 30 and 35, a sheet feeding mechanism 52, and a sheet ejection tray 90. The document reading device 2 optically reads image data of an original document. The exposure device 3 irradiates a photoconductor drum 5, which is included in the image forming device 4, with exposure light L according to the image data read by the document reading device 2. The image forming device 4 forms a toner image (image) on the photoconductor drum 5. The transfer device 7 transfers the toner image from the photoconductor 5 onto a sheet P.

The document feeding device 10 (automatic document feeder) conveys an original document set on a document loading table to the document reading device 2. The sheet tray 13 as a sheet feeding device stacks a sheet P (or sheets P). The bypass sheet feeding device 15 as a sheet conveying device conveys the sheet P (sheets P) set on a bypass sheet tray 16 by a user.

The fixing device 20 fixes a toner image (unfixed image) borne on the sheet P. The fixing roller 21 is disposed in the fixing device 20. The pressure roller 22 is disposed in the fixing device 20. The conveyance roller pairs 30 and 35 convey the sheet P along a sheet conveyance path. The sheet feeding mechanism 52 feeds the sheet P stacked on the sheet tray 13. The sheet ejection tray 90 places the sheet P ejected from the housing of the image forming apparatus 1.

The bypass sheet feeding device 15 includes, for example, the bypass sheet tray 16, a sheet feed roller 17, a sheet separation pad 18, and the conveyance roller pair 30.

The sheet feeding mechanism 52 includes, for example, a pickup roller 54, a sheet feed roller 53, and a sheet separation roller 55.

With reference to FIG. 1, a description is given of a basic image forming operation of the image forming apparatus 1.

The original document set on the document loading table is conveyed (fed) by the document feeding device 10, and then passes over the document reading device 2. At this time, the document reading device 2 optically reads the image data of the original document passing over the document reading device 2.

The image data optically read by the document reading device 2 is converted into electrical signals. The electrical signals of the image data are transmitted to the exposure device 3 (writing part). The exposure device 3 then emits the exposure light L such as laser light according to the electrical signals of the image data toward the surface of the photoconductor drum 5 of the image forming device 4.

Meanwhile, while the photoconductive drum 5 rotates in a clockwise direction in FIG. 1, the image forming device 4 performs a series of given image forming processes, such as a charging process, an exposing process, and a developing process, to form an image (toner image) corresponding to the image data on the photoconductive drum 5.

Then, the image (toner image) formed on the surface of the photoconductor drum 5 is transferred by the transfer device 7 as a part of the image forming device, onto the sheet P conveyed by a registration roller pair 6.

A description is now given of how the sheet P is conveyed to the transfer device 7 (as a part of the image forming device).

First, the sheet feeding mechanism 52 feeds the uppermost sheet P of the sheets P stacked on the sheet tray 13 toward the sheet conveyance path. Then, the sheet P passes the sheet conveyance path, along which multiple sheet conveyance roller pairs are disposed, and then reaches the position of the registration roller pair 6.

When the bypass sheet feeding device 15 that is disposed on one side of the image forming apparatus 1 is selected, the sheet P placed by the user on the bypass sheet tray 16 of the bypass sheet feeding device 15 is conveyed by the sheet feed roller 17 (conveyor) toward the sheet conveyance path to reach the position of the registration roller pair 6. When multiple sheets P are placed on the bypass sheet tray 16 of the bypass sheet feeding device 15, the uppermost sheet P is conveyed toward the sheet conveyance path to reach the position of the registration roller pair 6.

After reaching the position of the registration roller pair 6, the sheet P is then conveyed toward the transfer roller 7 (a part of the image forming device) in sync with movement of the image (toner image) formed on the surface of the photoconductor drum 5 for positioning.

After the transfer device 7 transfers the image (toner image) from the photoconductor drum 5 onto the sheet P in the transfer process, the sheet P passes the position of the transfer device 7 to be conveyed to the fixing device 20 along the sheet conveyance path. After reading the fixing device 20, the sheet P is conveyed to a portion between the fixing roller 21 and the pressure roller 22, so that the toner image is fixed to the sheet P by application of heat applied by the fixing roller 21 and pressure applied by the fixing roller 21 and the pressure roller 22. This process is the fixing process. After being fixed to the sheet P in the fixing process, the sheet P bearing the toner image is conveyed out from the fixing nip region between the fixing roller 21 and the pressure roller 22, and is ejected from the housing of the image forming apparatus 1 to the sheet ejection tray 90 to be placed as an output image. Thus, a series of the given image forming processes is completed.

A detailed description is now given of the configuration and functions of the bypass sheet feeding device 15 as a sheet conveying device, with reference to FIGS. 2 to 10.

Figure 2:
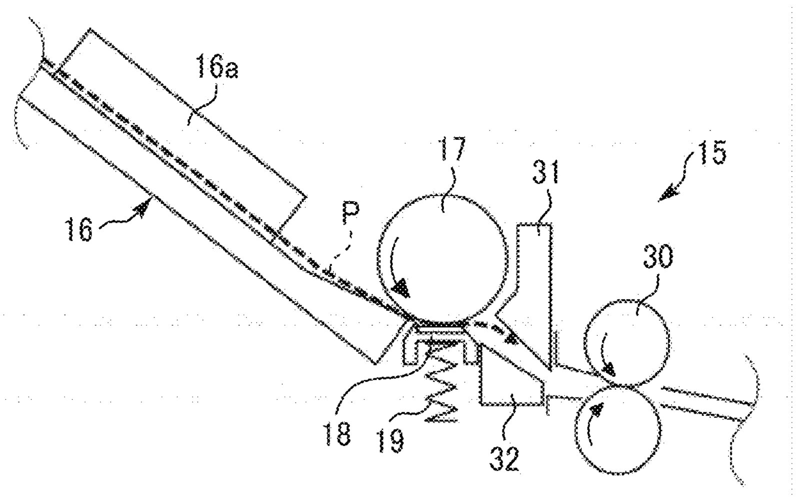
FIG. 2 is a schematic diagram illustrating a configuration of a sheet conveying device included in the image forming apparatus in FIG. 1.

FIG. 2 is a schematic diagram illustrating a configuration of a sheet conveying device included in the image forming apparatus in FIG. 1.

Figure 3:
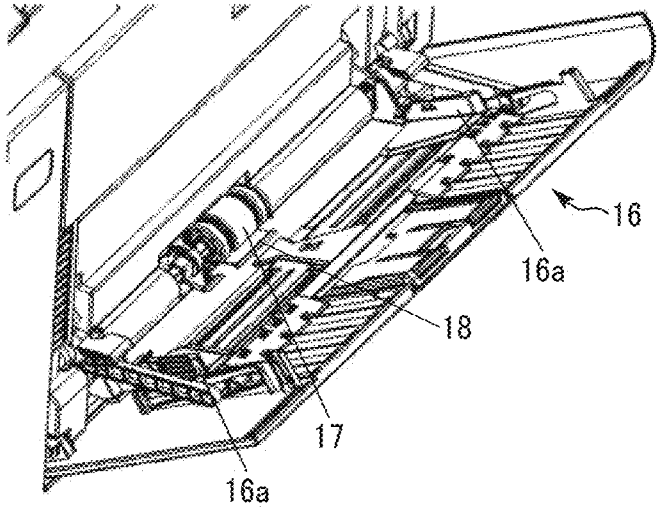
FIG. 3 is a perspective view of a part of a sheet conveying device according to an embodiment of the present disclosure.

FIG. 3 is a perspective view of a part of a sheet conveying device according to an embodiment of the present disclosure.

With reference to FIGS. 2 and 3, the bypass sheet feeding device 15 as a sheet conveying device according to the present embodiment includes the bypass sheet tray 16, conveyors including the sheet feed roller 17, the sheet separation pad 18 and a compression spring (biasing member) 19, the upper guide 31 as a guide, the lower guide 32 as a guide, and the conveyance roller pair 30.

The conveyors convey the sheet P manually set on the bypass sheet tray 16. The conveyors include the sheet feed roller 17 (sheet feed roller), the sheet separation pad 18, and the compression spring (biasing member) 19. The sheet feed roller 17 is driven by a driving mechanism to rotate in a counterclockwise direction illustrated in FIG. 2. The sheet separation pad 18 as a separator is in contact with the sheet feed roller 17. The compression spring 19 biases the sheet separation pad 18 in the direction in which the compression spring 19 contacts the sheet feed roller 17.

In the present embodiment, the sheet feed roller 17 (and the sheet separation pad 18) is disposed at the center in the width direction (i.e., the direction orthogonal to the drawing sheet of FIG. 2), and is set to convey the sheets P that is placed at the center reference, from the bypass sheet tray 16 without skew.

Since the sheet separation pad 18 is brought into contact with the sheet feed roller 17 to form a nip region, the failure in which two or more sheets P are fed (multiple feed) from the position of the nip region is prevented.

In the present embodiment, the sheet P is set on the bypass sheet tray 16 so that the leading end of the sheet P is bit in the nip region between the sheet feed roller 17 and the sheet separation pad 18. Further, the posture (position) of the sheet P (sheets P) that is set on the bypass sheet tray 16 in the width direction (i.e., the direction orthogonal to the drawing sheet of FIG. 2) is defined by a pair of side fences 16*a* (see FIGS. 2 and 3).

Figure 6:
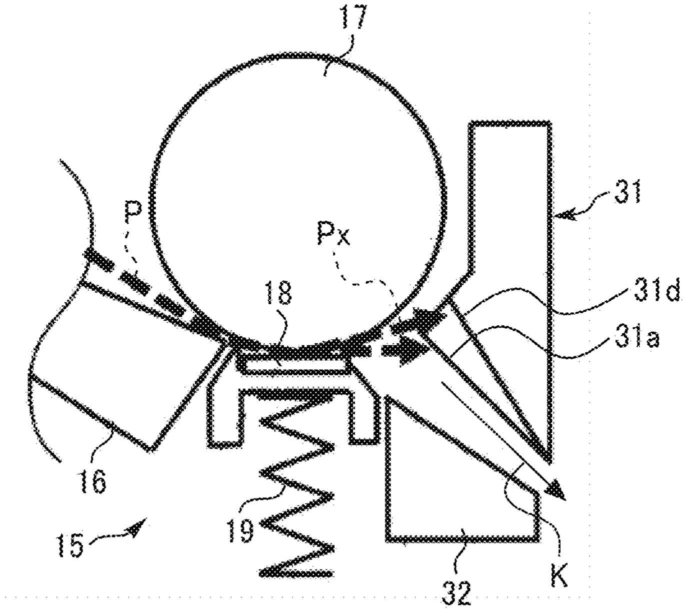
FIG. 6 is a diagram illustrating a trajectory of conveyance of a warped sheet to the position of an upper guide.

The upper guide 31 and the lower guide 32 function as a guide that guides the sheet P conveyed by the sheet feed roller 17 (conveyor) to the downstream side in the conveyance direction (i.e., the direction indicated by arrow K in FIG. 6).

The upper guide 31 is disposed facing the front face of the sheet P. The lower guide 32 is disposed facing the back face of the sheet P. A space between the two guides (i.e., the upper guide 31 and the lower guide 32) facing each other includes a sheet conveyance path defined by the two guides. Further, the conveyance roller pair 30 is disposed downstream from the upper guide 31 and the lower guide 32 in the sheet conveyance direction to further convey the sheet P to the downstream side in the sheet conveyance direction.

In particular, as illustrated in FIG. 6, in the bypass sheet feeding device 15 (sheet conveying device) according to the present embodiment, the tangential direction (i.e., the direction indicated by the thick arrow in FIG. 6) of the sheet feed roller 17 that passes through the nip region between the sheet feed roller 17 and the sheet separation pad 18 is substantially horizontal while the sheet conveyance direction K (as indicated by arrow in FIG. 6) of the sheet conveyance path defined by the upper guide 31 and the lower guide 32 is inclined downward from upstream toward downstream. Due to such a configuration, the sheet P conveyed from the nip region between the sheet feed roller 17 and the sheet separation pad 18 is brought to contact the upper guide 31, and is then guided along the sloped face of the upper guide 31 (in other words, a reference guide face 31*a* that will be described below).

Figure 4:
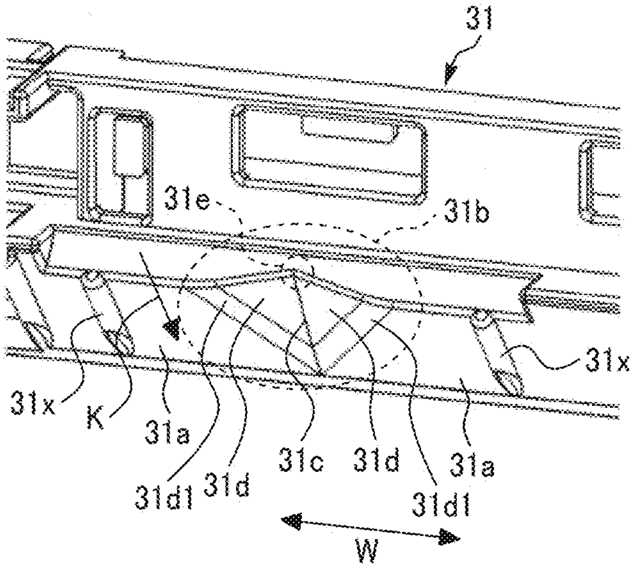
FIG. 4 is a perspective view of an upper guide.

FIG. 4 is a perspective view of the upper guide 31.

FIG. 6 is a diagram illustrating a trajectory of conveyance of a warped sheet to the position of the upper guide 31.

Referring to FIGS. 4 and 6, the upper guide 31 as a guide according to the present embodiment has the reference guide face 31*a* and a concave 31*b*.

The reference guide face 31*a* is a plane that extends along the above-described sheet conveyance direction K (as indicated by arrow in FIG. 6).

The sheet P conveyed by the sheet feed roller 17 (conveyor) is conveyed (guided) along the reference guide face 31*a* of the upper guide 31. In the present embodiment of this disclosure, in order to reduce the sheet conveyance load (frictional resistance) generated as the sheet P slidably contacts the reference guide face 31*a*, multiple ribs 31*x* are arranged at intervals in the width direction (arrow W) so as to extend in the sheet conveyance direction on the reference guide face 31*a*.

The reference guide face 31*a* according to the present embodiment has a flat surface (plane). However, the reference guide face 31*a* may have a curved surface.

Further, when the surface friction coefficient of the reference guide face 31*a* is set to be relatively small, the multiple ribs 31*x* may be omitted.

With reference to FIGS. 4 and 6, the concave 31*b* is a portion that is recessed in a substantially triangular pyramid shape in the retraction direction away from the sheet conveyance path (i.e., a sheet conveyance path defined by the upper guide 31 and the lower guide 32) with respect to the reference guide face 31*a*. In other words, the upper guide 31 has the concave 31*b* formed in the direction (retraction direction) that does not project into the sheet conveyance path relative to the reference guide face 31*a*. In the present embodiment, the concave 31*b* is formed at the center in the width direction of the upper guide 31.

As illustrated in FIG. 4. the concave 31*b* has an edge portion 31*c* extending from a vertex 31*e*, which is a most recessed portion most recessed in the retraction direction, and leading to the reference guide face 31*a* toward the downstream side in the sheet conveyance direction K (as indicated by arrow in FIG. 6). Further, the concave 31*b* is inclined toward downstream in the sheet conveyance direction and is inclined outward in the width direction (arrow W) that is orthogonal to the sheet conveyance direction within the plane of the reference guide face 31*a*, so that a pair of sloped faces 31*d* that is led to the reference guide face 31*a* is disposed to sandwich the edge portion 31*c*.

In particular, the upper guide 31 (guide member) according to the present embodiment has the edge portion 31*c* having an angular shape. In other words, the edge portion 31*c* is formed as an inner corner. For this reason, the concave 31*b* according to the present embodiment is inclined toward downstream in the sheet conveyance direction K, with the inner corner (edge portion 31*c*) that leads the vertex 31*e* that is most recessed in the retraction direction to the reference guide face 31*a*, and is also inclined outward in the width direction within the plane of the reference guide face 31*a*. Due to such a configuration, the pair of sloped faces 31*d* that is led to the reference guide face 31*a* is formed so as to sandwich the inner corner (edge portion 31*c*).

In other words, the edge portion 31*c* of the concave 31*b* is positioned within the same plane as the reference guide face 31*a* at the downstream end in the sheet conveyance direction, and the vertex 31*e* that is the upstream end in the sheet conveyance direction is located at the position that is most retracted from the reference guide face 31*a*. Of the pair of sloped faces 31*d*, one sloped face 31*d* that is located at one end in the width direction (the right side of FIG. 4) relative to the edge portion 31*c* is formed to approach the same plane as the reference guide face 31*a* as the one sloped face 31*d* extends toward the one end in the width direction and the downstream side in the sheet conveyance direction as one edge. Similarly, of the pair of sloped faces 31*d*, the other sloped face 31*d* that is located at the other end in the width direction (the left side of FIG. 4) relative to the edge portion 31*c* is formed to approach the same plane as the reference guide face 31*a* as the other sloped face 31*d* extends toward the other end in the width direction and the downstream side in the sheet conveyance direction as one edge.

The portion where the reference guide face 31*a* and the sloped faces 31*d* meet is formed as a curved face 31*d*1 having a curved surface. A detailed description of this configuration is given below.

Further, in other words, the concave 31*b* is inclined toward downstream in the sheet conveyance direction and is also inclined outward in the width direction within the plane of the reference guide face 31*a*, so that the pair of sloped faces 31*d* that is led to the reference guide face 31*a* is disposed to sandwich the vertex 31*e* that is most recessed in the retraction direction.

Figure 5:
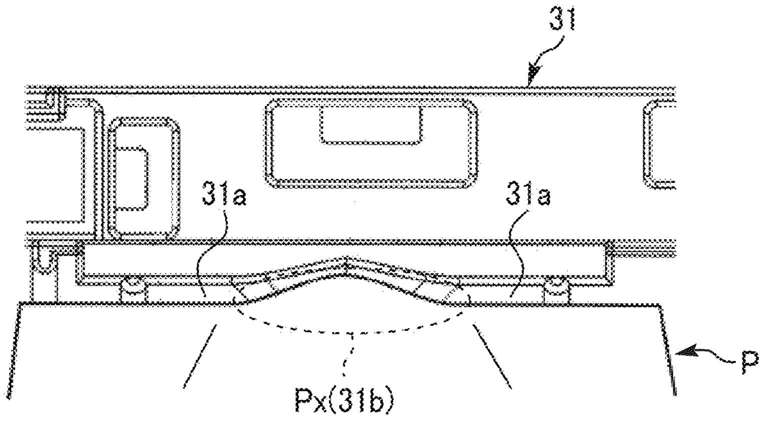
FIG. 5 is a perspective view of an upper guide in a state where a warped sheet is in contact with an upper guide.

FIG. 5 is a perspective view of the upper guide 31 in a state where a warped sheet is in contact with the upper guide 31.

In particular, as illustrated in FIG. 5, in the upper guide 31 according to the present embodiment, the position in the width direction (i.e., the left-and-right direction in FIG. 5) of the vertex 31*e* (see FIG. 4) of the concave 31*b* is set to substantially match the center position in the width direction of a wave portion Px that is generated in the sheet P conveyed by the sheet feed roller 17 (conveyor).

Figure 10:
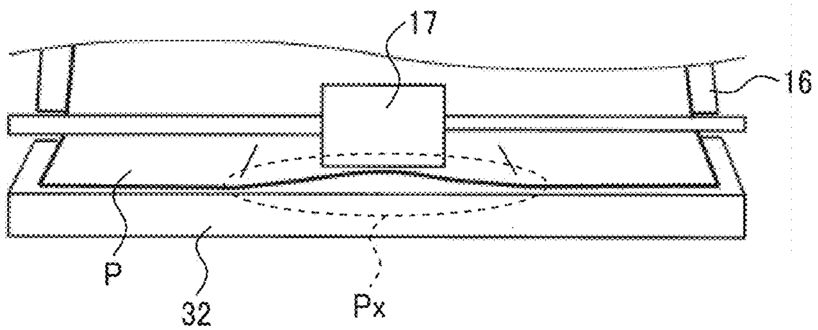
FIG. 10 is a perspective view of a bypass tray and a lower guide, illustrating a state where a sheet fed from the bypass tray is warped, viewed from the lower guide.

FIG. 10 is a perspective view of the bypass sheet tray 16 and the lower guide 32, illustrating a state where the sheet P fed from the bypass sheet tray 16 is warped, viewed from the lower guide 32.

As illustrated in FIG. 10, since the sheet feed roller 17 (sheet feed roller) is disposed at the center in the width direction (widthwise center), the sheets P fed by the sheet feed roller 17 have a difference in frictional resistance between the portions that directly contact the sheet feed roller 17 and the portions that do not directly contact the sheet feed roller 17. This difference in frictional resistance is likely to cause the sheet P to have a wave portion (in a state where the sheet P is curved and wavy) at the portions that directly contact the sheet feed roller 17 (in particular, the leading end of a sheet P). In other words, it is likely to form the wave portion Px. In order to address such an inconvenience, the reference guide face 31*a* of the upper guide 31 according to the present embodiment has the concave 31*b* at the position corresponding to the wave portion Px of such a sheet P.

As described above, the bypass sheet feeding device 15 (sheet conveying device) according to the present embodiment, the concave 31*b* is recessed in a substantially triangular pyramid shape with respect to the reference guide face 31*a*, and is formed to approach within the same plane as the reference guide face 31*a* as the concave 31*b* extends toward both ends in the width direction and toward downstream in the sheet conveyance direction. For this reason, even when a wave is generated at the leading end in the sheet conveyance direction of the sheet P that is conveyed by the sheet feed roller 17 (conveyor), and even if the wave portion Px is formed, the inconvenience that the sheet P is brought to a paper jam at the position of the upper guide 31 can be reduced.

Figure 11A:
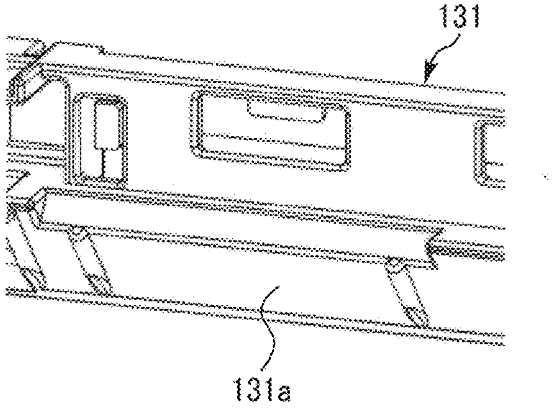
FIGS. 11A and 11B are perspective views of an upper guide in a state where a warped sheet is conveyed to the position of the upper guide, as a comparative example.
Figure 11B:
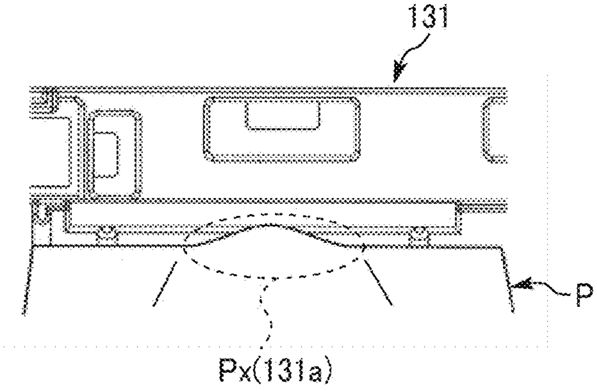

FIGS. 11A and 11B are perspective views of an upper guide 131 in a state where a warped sheet is conveyed to the position of the upper guide 131, as a comparative example.

Figure 12:
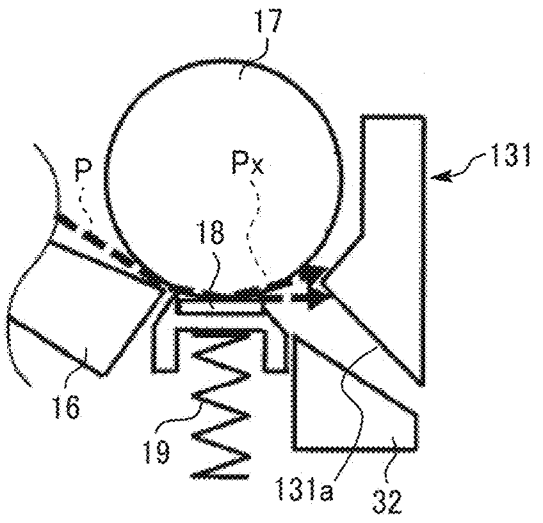
FIG. 12 is a diagram illustrating a trajectory of conveyance of a warped sheet to the position of the upper guide in FIGS. 11A and 11B.

FIG. 12 is a diagram illustrating a trajectory of conveyance of a warped sheet to the position of the upper guide 131 in FIGS. 11A and 11B, as a comparative example.

Like the upper guide 131 illustrated in FIGS. 11A, 11B and 12 as a comparative example, when a concave is not formed on a reference guide face 131*a*, the wave portion Px of the sheet P, which is a portion indicated by a circle with a broken line in FIGS. 11B and 12, tends to climb over the upper guide 131 or get caught on the upper guide 131 causing buckling. This action results in an inconvenience to cause the sheet P to be jammed (paper jam). Such an inconvenience is referred to as a “guide out” situation as appropriate.

To prevent the occurrence of such a “guide out” situation, a measurement of extending the upper end of the reference guide face 131*a* upward may be considered. The upper end of the reference guide face 131*a* indicates the upstream end of the reference guide face 131*a* in the sheet conveyance direction. However, in that case, the upper guide 131 may increase in size and cost, or there may be limitations on the installation space for the upper guide 131, which could lead to constraints in the measurement. In other words, the upper guide 131 interferes with the sheet feed roller 17.

In order to prevent the occurrence of the “guide out” situation, another measurement may be considered that the reference guide face 131*a* is overall retracted in the direction away from the nip region between the reference guide face 131*a* and the sheet feed roller 17. However, in that case, as the angle formed between the leading end of the sheet P and the upper guide 131 increases, the sheet conveyance load also increases. As a result, the sheet P tends to buckle or the conveyance force from the sheet feed roller 17 becomes insufficient. In contrast, as the angle formed between the leading end of sheet P and the upper guide 131 decreases, constraints are more likely to occur in the installation space of the upper guide 131.

Furthermore, another measurement is also conceivable to implement a correction lever (decurl lever) that varies the sheet conveyance direction of the sheet P conveyed by the sheet feed roller 17 to the forward and reverse directions or corrects (straightens) the wave portion Px of the sheet P. However, in that case, an inconvenience (failure) may occur that complicate control and configuration, decrease the productivity of sheet feeding, and result in the increase in size and high costs of the equipment.

By contrast, in the present embodiment, without reflecting the various measurements described above, the concave 31*b* is formed in the upper guide 31 to easily reduce the occurrence of a “guide out” situation.

Further, when the wave portion Px of the sheet P slidably contacts on the sloped faces 31*d* of the concave 31*b* or on the portion where the sloped faces 31*d* and the reference guide face 31*a* meet, the sheet conveyance load of the sheet P can be made smaller when compared with a configuration in which the wave portion Px slidably contacts on the guide face that is not formed in the concave 31*b* (which is a planar guide surface extending to the area including the edge portion 31*c* in the present embodiment).

Accordingly, even when the wave portion Px is formed at the leading end of the sheet P conveyed by the sheet feed roller 17 (conveyor), the inconvenience that the sheet P is brought to a paper jam at the position of the upper guide 31 (guide member) can be reduced, and the sheet conveyance load is reduced to perform a good conveyance.

As illustrated in FIG. 5, when the leading end of the sheet P conveyed by the sheet feed roller 17 reaches the position of the upper guide 31, the parts except for the wave portion Px contact the reference guide face 31*a*. However, the wave portion Px (the vertex, in particular) is located at the position where the wave portion Px slightly contact the concave 31*b* (or faces the concave 31*b* across a gap), and does not contact the reference guide face 31*a*. For this reason, the wave portion Px of the sheet P is less likely to cause an inconvenience that the wave portion Px tends to climb over the upper guide 131 or get caught on the upper guide 131 causing buckling.

Moreover, the sloped faces 31*d* of the concave 31*b* are formed to approach the reference guide face 31*a* as the sloped faces 31*d* extends toward downstream in the sheet conveyance direction and both ends in the width direction, so as to eventually meet the reference guide face 31*a*. As a result, sheet P is gradually smoothed out by the sloped faces 31*d*, and eventually becomes substantially planar following the reference guide face 31*a* (the waves disappear). Due to such a configuration, the sheet P that passes the upper guide 31 and the lower guide 32 is preferably conveyed further downstream in the sheet conveyance direction.

Figure 9:
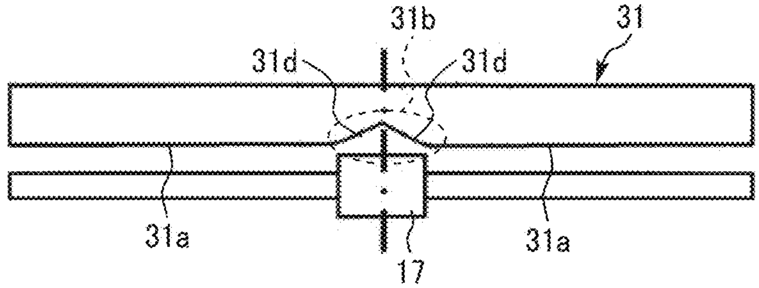
FIG. 9 is a diagram illustrating the relative positions of an upper guide and a sheet roller in a width direction.

FIG. 9 is a diagram illustrating the relative positions of the upper guide 31 and the sheet feed roller 17 in the width direction.

As illustrated in FIG. 9, in the present embodiment, the position in the width direction (i.e., the left-and-right direction in FIG. 9) of the vertex 31*e* (see FIG. 4) in the concave 31*b* of the upper guide 31 is set to substantially match the center position (I.e., the position indicated by the broken line in FIG. 9) in the width direction of the sheet feed roller 17 (conveyor).

With the above-described configuration, even when the sheet feed roller 17 causes a wave portion Px in the sheet P and when the sheet P contacts the upper guide 31, the concave 31*b* can effectively avoid the “guide out” situation of the wave portion Px by the concave 31*b*.

As described above with reference to FIG. 4, the upper guide 31 (guide member) according to the present embodiment has a curved face in the portion where the reference guide face 31*a* and the sloped faces 31*d* meet.

In other words, the portion connecting the portion where the reference guide face 31*a* and the sloped faces 31*d* meet is not an angled portion but has a curved face 31*d*1 (a curved surface warped outwardly toward the side where the sheet P is guided) without an angled portion.

As described above, the portion where the reference guide face 31*a* and the sloped faces 31*d* meet is the curved face 31*d*1. By so doing, when the leading end of a sheet P reaches the position, it is less likely to cause an inconvenience that the sheet P to bounce or the sheet conveyance load of the sheet P to increase.

In order to fully exhibit such an effect, the curved face 31*d*1 is preferably set to have a radius of curvature equal to or greater than 1 mm.

Further, the upper guide 31 (guide member) according to the present embodiment has the pair of sloped faces 31*d* to be line-symmetrical (linearly symmetrical) with respect to the edge portion 31*c* (see FIG. 4).

With the above-described configuration, when the sheet P that is conveyed by the sheet feed roller 17 passes the position of the concave 31*b*, the variation in the sheet conveyance load on the left and right sides, defined by the edge portion 31*c*, is reduced to make the sheet P less likely to skew.

With reference to FIGS. 7A, 7B, 8A and 8B, a description is given below of the upper guide 31 illustrating the movement of the warped sheet P when the sheet P is conveyed toward downstream in the sheet conveyance direction from the position of the upper guide 31.

Figure 7A:
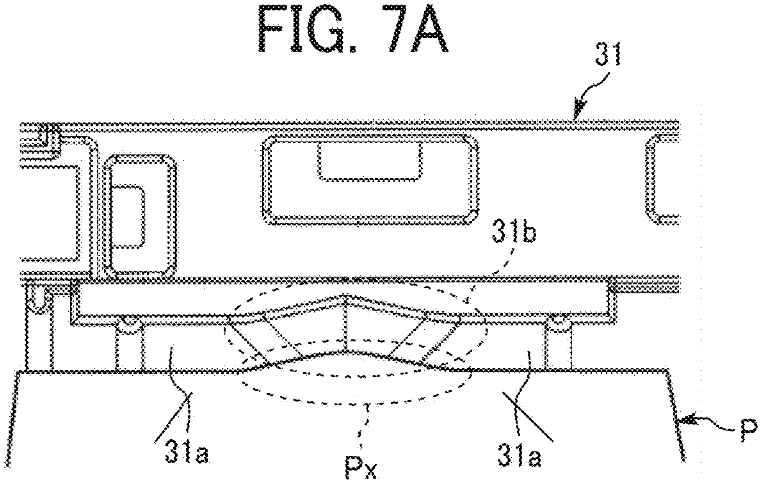
FIGS. 7A and 7B are perspective view of an upper guide in a state where a warped sheet is conveyed from the position of the upper guide to a downstream side in a sheet conveyance direction.
Figure 7B:
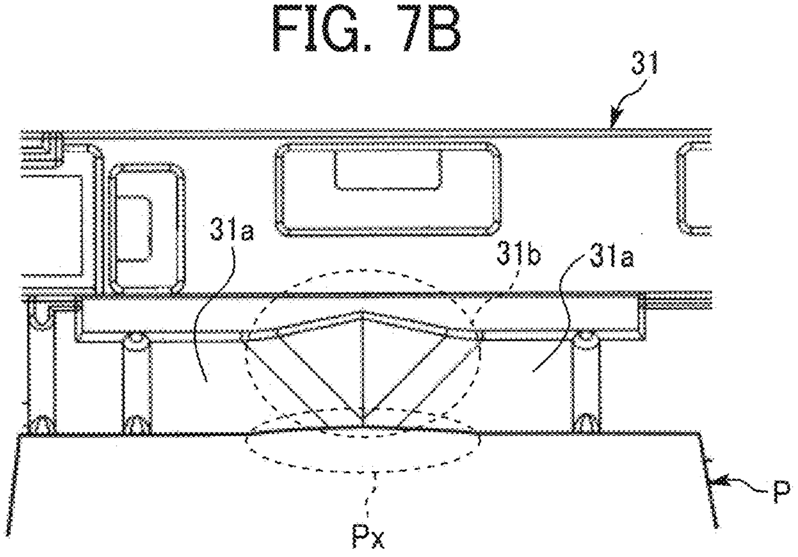

FIGS. 7A and 7B are perspective view of the upper guide 31 in a state where a warped sheet is conveyed from the position of the upper guide 31 to the downstream side in the sheet conveyance direction.

Figure 8A:
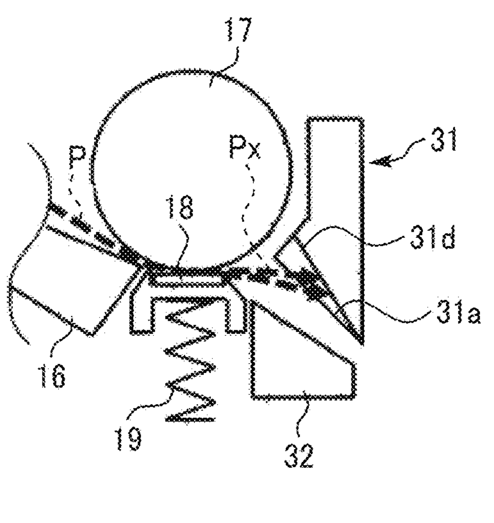
FIGS. 8A and 8B are side views of an upper guide illustrating a trajectory of conveyance of a warped sheet from the position of the upper guide to a downstream side in a sheet conveyance direction.
Figure 8B:
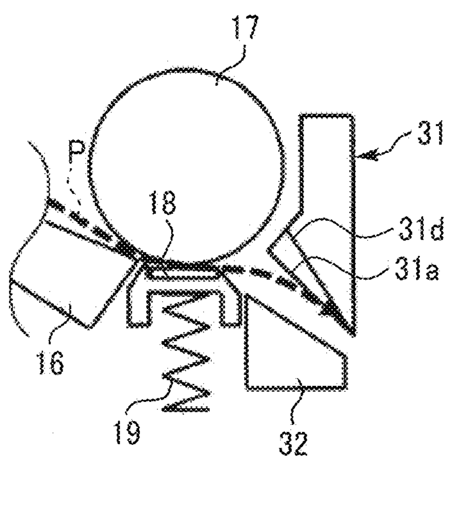

FIGS. 8A and 8B are side views of the upper guide 31 illustrating a trajectory of conveyance of a warped sheet from the position of the upper guide 31 to the downstream side in the sheet conveyance direction.

As illustrated in FIGS. 7A, 7B, 8A and 8B, as the warped sheet P is conveyed toward downstream in the sheet conveyance direction along the reference guide face 31*a* (and the concave 31*b*), the sloped faces 31*d* lift the wave portion Px to the sheet conveyance path to approach to the plane. In other words, the warped (curled) sheet P is decurled.

At this time, since the portion where the sloped faces 31*d* and the reference guide face 31*a* meet is the curved face 31*d*1, it is less likely to cause an inconvenience that the sheet P bounces or that the sheet conveyance load of the sheet P increases.

Further, since the sloped faces 31*d* are formed to gradually approach the reference guide face 31*a* toward downstream in the sheet conveyance direction and both ends in the width direction, the sheet P is smoothly guided without the sheet P being caught by the upper guide 31 when compared with a configuration in which a steep step is formed between the sloped faces 31*d* and the reference guide face 31*a*.

Modification 1

Figure 13:
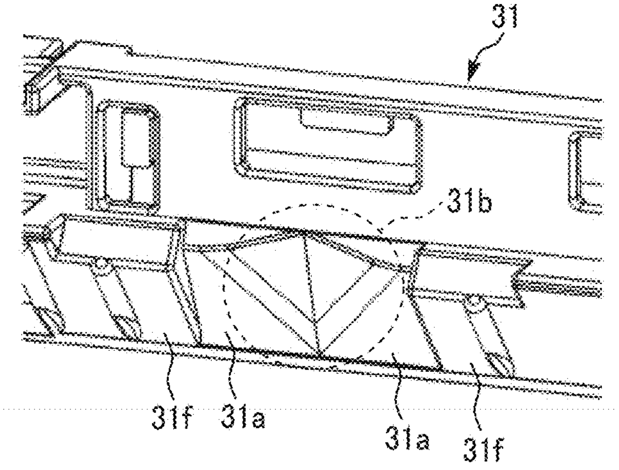
FIG. 13 is a perspective view of an upper guide according to Modification 1.

A description is given of the upper guide 31 according to Modification 1, with reference to FIG. 13.

FIG. 13 is a perspective view of the upper guide 31 according to Modification 1.

As illustrated in FIG. 13, the upper guide 31 (guide member) according to Modification 1 includes a pair of second reference guide face 31*f* formed in the direction to be closer to the sheet conveyance path than the reference guide face 31*a*. The pair of second reference guide faces 31*f* is disposed such that the second reference guide faces 31*f* sandwich the reference guide face 31*a*.

In other words, the reference guide face 31*a* is recessed in the retraction direction with respect to the second reference guide faces 31*f*, and further has the concave 31*b* in the retraction direction with respect to the reference guide face 31*a*.

The reference guide face 31*a* approaches the same plain as the second reference guide faces 31*f* as the reference guide face 31*a* extends toward downstream in the sheet conveyance direction, and eventually meets the second reference guide faces 31*f*.

With the configuration described above, the upper guide 31 has a recessed portion (concaved portion) to avoid interference with the wave portion Px of the sheet P, and the recessed portion includes the reference guide face 31*a* in two steps in addition to the concave 31*b*. Due to such a configuration, occurrence of the "guide out" situation can be further reduced or prevented. In particular, such a configuration described above is useful when wave portion Px has a wide range in the width direction.

Modification 2

Figure 14:
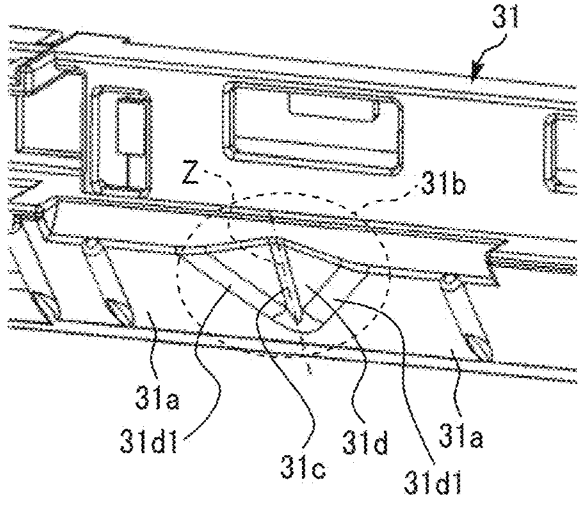
FIG. 14 is a perspective view of an upper guide according to Modification 2.

A description is given of the upper guide 31 according to Modification 2, with reference to FIG. 14.

FIG. 14 is a perspective view of the upper guide 31 according to Modification 2.

As illustrated in FIG. 14, the upper guide 31 (guide member) according to Modification 2 has an edge portion 31*c* with a curved face.

In other words, the edge portion 31*c* does not have an angular shape (the edge portion 31*c* is not formed as an inner corner), but has a rounded, gently curved face (a concave curved on the side guiding the sheet P).

The broken line Z illustrated in FIG. 14 indicates the center position (virtual inner corner) of the edge portion 31*c* having the curved face.

Since the edge portion 31*c* has a curved face as described above, when the leading end of the sheet P reaches the position, the damage generated when the sheet P contacts the edge portion 31*c* can be mitigated (reduced).

Further, even when the upper guide 31 has the above-described configuration and even when a wave is generated at the leading end of the sheet P that is conveyed by the sheet feed roller 17, the inconvenience that the sheet P is brought to a paper jam at the position of the upper guide 31 (guide member) can be easily reduced.

Modification 3

Figure 15:
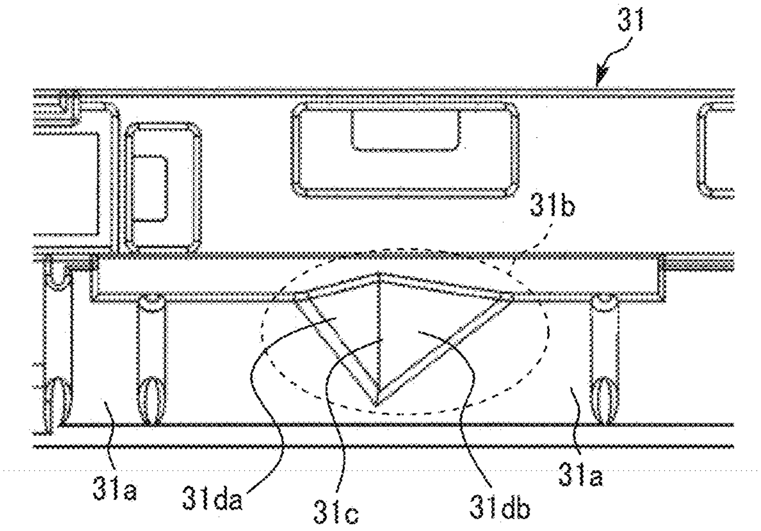
FIG. 15 is a perspective view of an upper guide according to Modification 3.

A description is given of the upper guide 31 according to Modification 3, with reference to FIG. 15.

FIG. 15 is a perspective view of the upper guide 31 according to Modification 3.

As illustrated in FIG. 15, the upper guide 31 (guide member) according to Modification 3 does not have the pair of sloped faces 31*d* to be line-symmetrical (linearly symmetrical) with respect to the edge portion 31*c* (in other words, the upper guide 31 is formed to be non-line-symmetrical (linearly asymmetrical) with respect to the edge portion 31*c*).

Such a configuration is useful in a case where sloped faces 31*da* and 31*db* in pair are not formed to be line-symmetrical (linearly asymmetrical) with respect to the edge portion 31*c* due to the layout to install other members in the vicinity of the upper guide 31. For example, an opening is formed in the upper guide 31 to avoid the optical path of an optical sensor for sheet detection.

However, even when the upper guide 31 has the above-described configuration and even when a wave is generated at the leading end of the sheet P that is conveyed by the sheet feed roller 17, the inconvenience that the sheet P is brought to a paper jam at the position of the upper guide 31 (guide member) can be easily reduced.

Modification 4

Figure 16A:
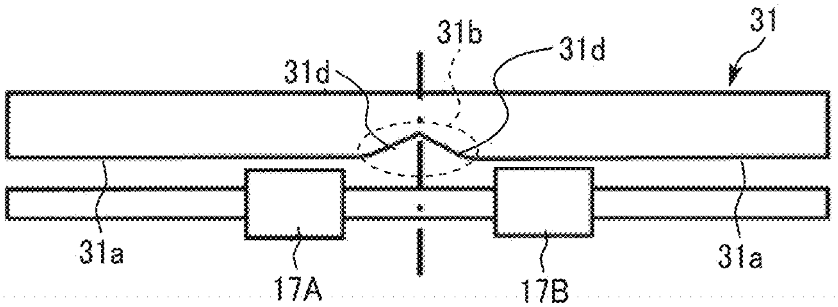
FIGS. 16A and 16B are diagrams illustrating the relative positions of an upper guide and a sheet roller in a width direction according to Modification 4.
Figure 16B:
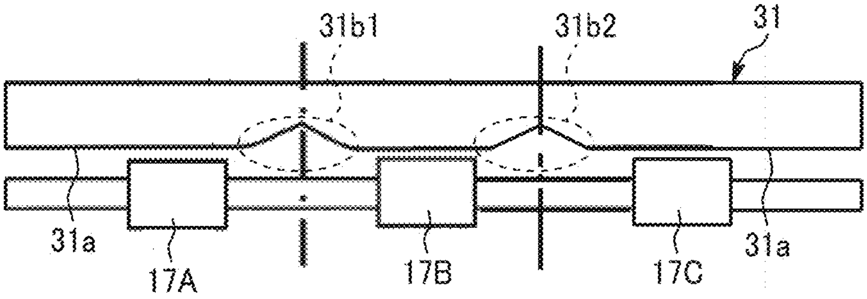

A description is given of the upper guide 31 according to Modification 4, with reference to FIGS. 16A and 16B.

FIGS. 16A and 16B are diagrams illustrating the relative positions of the upper guide 31 and the sheet feed roller 17 in the width direction according to Modification 4.

As illustrated in FIGS. 16A and 16B, the bypass sheet feeding device 15 (sheet conveying device) according to Modification 4 includes multiple sheet feed rollers (feed rollers) as conveyors in the width direction (the left-and-right direction in FIGS. 16A and 16B).

Then, the upper guide 31 (guide member) has the concave 31*b* corresponding to the position between adjacent sheet feed rollers (conveyors) adjacent to each other of the multiple sheet feed rollers (conveyors).

To be more specific, two sheet feed rollers 17A and 17B (conveyors) illustrated in FIG. 16A are aligned at an interval on a rotary shaft, and are driven by a driving mechanism to be rotated together as a single unit.

The upper guide 31 has the concave 31*b* corresponding to the position between the two sheet feed rollers 17A and 17B. In particular, the position in the width direction (the left-and-right direction in FIG. 16A) of the vertex 31*e* of the concave 31*b* of the upper guide 31 is set to substantially match the center position (the position indicated by a broken line in FIG. 16A) between the two sheet feed rollers 17A and 17B (conveyors) aligned in the width direction.

This configuration described above uses two sheet feed rollers 17A and 17B (rollers) as conveyors aligned with each other, and is useful in a case where the wave portion Px of the sheet P to be fed by the sheet feed rollers 17A and 17B is formed between the two sheet feed rollers 17A and 17B.

Further, in such a case, even when a wave is generated at the leading end of the sheet P that is conveyed by the sheet feed rollers 17A and 17B, since the concave 31*b* is formed at the position of the upper guide 31 corresponding to the position of the wave, the inconvenience that the sheet P is brought into a paper jam at the position of the upper guide 31 (guide member) can be easily reduced.

Further, the bypass sheet feeding device 15 (sheet conveying device) illustrated in FIG. 16B includes three sheet feed rollers 17A, 17B and 17C (conveyors) that are aligned at intervals on a rotary shaft. The sheet feed rollers 17A, 17B and 17C are driven by a driving mechanism to be rotated together as a single unit.

The upper guide 31 has multiple concaves 31*b*1 and 31*b*2 formed at positions corresponding to the position between adjacent sheet feed rollers of the three sheet feed rollers 17A, 17B and 17C. To be more specific, the first concave 31*b*1 is formed at the position corresponding to a position (the center position indicated by the broken line on the left of FIG. 16B) between the first sheet feed roller 17A and the second sheet feed roller 17B. The second concave 31*b*2 is formed at the position corresponding to a position (the center position indicated by the broken line on the right of FIG. 16B) between the second sheet feed roller 17B and the third sheet feed roller 17C. In such a configuration, the similar effects to the effects by the configuration illustrated in FIG. 16A can be achieved. In a case where four (4) or more sheet feed rollers are provided, the configuration similar to the above-described configuration can be applied.

In this specification, “multiple conveyors” is defined to include not only conveyors by which multiple sheet feed rollers are driven and rotated separately, but also conveyors as indicated by FIGS. 16A and 16B (FIG. 17 described below), where multiple sheet feed rollers are provided on a rotary shaft and are driven and rotated together as a single unit.

Modification 5

Figure 17:
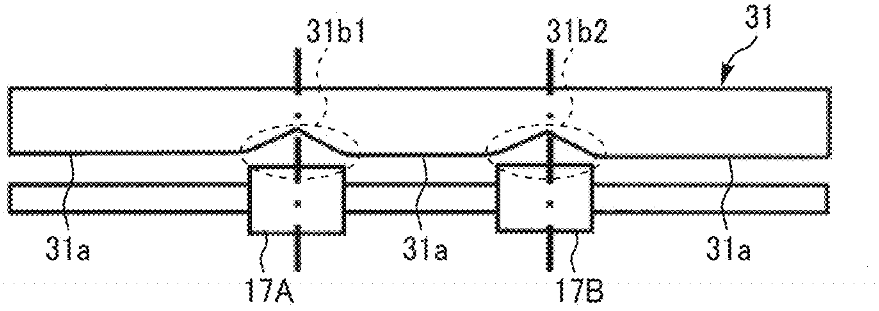
FIG. 17 is a diagram illustrating the relative positions of an upper guide and a sheet roller in a width direction according to Modification 5.

A description is given of the upper guide 31 according to Modification 5, with reference to FIG. 17.

FIG. 17 is a diagram illustrating the relative positions of an upper guide and a sheet roller in the width direction according to Modification 5.

As illustrated in FIG. 17, the bypass sheet feeding device 15 (sheet conveying device) according to Modification 5 includes multiple sheet feed rollers 17A and 17B (conveyors) in the width direction (the left-and-right direction in FIG. 17), as in the configuration of FIG. 16A.

As illustrated in FIG. 17, the upper guide 31 (guide member) according to Modification 5 includes multiple concaves 31*b*1 and 31*b*2 corresponding to the multiple sheet feed rollers 17A and 17B (conveyors).

To be more specific, two sheet feed rollers 17A and 17B (conveyors) illustrated in FIG. 17 are aligned at an interval on a rotary shaft, and are driven by a driving mechanism to be rotated together as a single unit.

Regarding the configuration of the upper guide 31, the position in the width direction of the vertex 31*e* of the concave 31*b* (the multiple concaves 31*b*1 and 31*b*2) is set to substantially matches the center position of each of the two sheet feed rollers 17A and 17B (the positions indicated by the broken lines in FIG. 17).

The configuration described above uses two sheet feed rollers 17A and 17B (rollers) as conveyors aligned with each other, and is useful in a case where the wave portion Px of the sheet P to be fed by the sheet feed rollers 17A and 17B is formed at respective positions of the two sheet feed rollers 17A and 17B.

Further, in such a case, even when a wave is generated at the leading end of the sheet P that is conveyed by the sheet feed rollers 17A and 17B, since the concave 31*b* is formed at the position of the upper guide 31 corresponding to the position of the wave, the inconvenience that the sheet P is brought into a paper jam at the position of the upper guide 31 (guide member) can be easily reduced. In a case where three (3) or more sheet feed rollers are provided, the configuration similar to the above-described configuration can be applied.

Modification 6

Figure 18A:
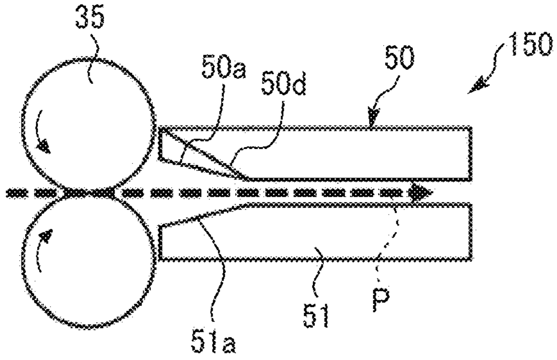
FIGS. 18A and 18B are diagrams illustrating a sheet conveying device according to Modification 6.
Figure 18B:
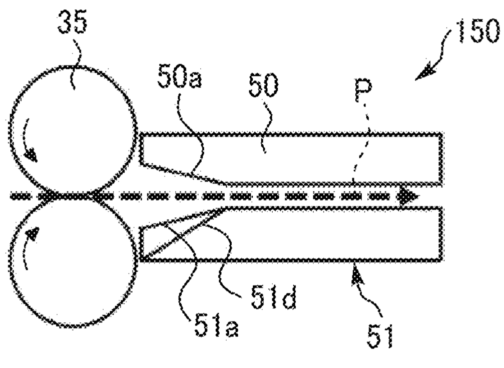

A description is given of the sheet conveying device 150 according to Modification 6, with reference to FIGS. 18A and 18B.

FIGS. 18A and 18B are diagrams illustrating the sheet conveying device 150 according to Modification 6.

As illustrated in FIGS. 18A and 18B, the sheet conveying device 150 according to Modification 6 includes not the sheet feed roller 17 and the sheet separation pad 18 as conveyors as in the bypass sheet feeding device 15 illustrated in FIG. 2 but a conveyance roller pair 35 including two conveyance rollers as a conveyor.

As illustrated in FIGS. 18A and 18B, the sheet conveying device 150 according to Modification 6 includes the conveyance roller pair 35, an upper guide 50, and a lower guide 51. The conveyance roller pair 35 includes two conveyance rollers in contact with each other to form a nip region. The upper guide 50 and the lower guides 51 guide the sheets P conveyed by the conveyance roller pair 35 (conveyor). A sheet conveyance path is formed between and defined by the upper guide 50 and the lower guide 51, and the conveyance roller pair 35 conveys the sheet P in the sheet conveyance direction (indicated by the broken line in FIGS. 18A and 18B). The upper guide 50 has a reference guide face 50*a* and the lower guide 51 has a reference guide face 51*a*. The reference guide faces 50*a* and 51*a* are contactable with the leading end of the sheet P conveyed from the nip region of the conveyance roller pair 35. Such the reference guide faces 50*a* and 51*a* are interpreted as “members that extend in the sheet conveyance direction.” Such a sheet conveyance path is provided, for example, at the position of the conveyance roller pair 35 illustrated in FIG. 1. However, the position of the sheet conveyance path is not limited to the position of the conveyance roller pair 35. Furthermore, the sheet conveyance path is not limited to a member that extends from the nip region of the sheet conveyance roller pair in substantially the horizontal direction, as illustrated in FIGS. 18A and 18B.

In other words, the upper guide 50 illustrated in FIG. 18A has a concave 50*b* that is recessed in the retraction direction away from the sheet conveyance path with respect to the reference guide face 50*a*. Further, similar to the configuration illustrated in FIG. 4, the concave 50*b* according to Modification 6 has an edge portion 50*d* extending from the vertex that is most recessed in the retraction direction and leading to the reference guide face 50*a* toward downstream in the sheet conveyance direction. The concave 50*b* is inclined toward downstream in the sheet conveyance direction, and is also inclined outward in the width direction within the plane of the reference guide face 50*a*. Due to such a configuration, the pair of sloped faces that is led to the reference guide face 50*a* is formed so as to sandwich the edge portion 50*d*.

Such a configuration is useful in a case where the wave portion Px that projects upward is formed at the leading end of the sheet P conveyed by the conveyance roller pair 35.

On the other hand, the lower guide 51 illustrated in FIG. 18B has a concave 51*b* that is recessed in the retraction direction away from the sheet conveyance path relative to the reference guide face 51*a*. Further, similar to the configuration illustrated in FIG. 4, the concave 51*b* according to Modification 6 has an edge portion 51*d* extending from the vertex that is most recessed in the retraction direction and leading to the reference guide face 51*a* toward downstream in the sheet conveyance direction. The concave 51*b* is inclined toward downstream in the sheet conveyance direction, and is also inclined outward in the width direction within the plane of the reference guide face 51*a*. Due to such a configuration, the pair of sloped faces that is led to the reference guide face 51*a* is formed so as to sandwich the edge portion 51*d*.

Such a configuration is useful in a case where the wave portion Px that projects downward is formed at the leading end of the sheet P conveyed by the conveyance roller pair 35.

Further, in such a case, even when a wave is generated at the leading end of the sheet P that is conveyed by the conveyance roller pair 35, since the concave 50*b* (or the concave 51*b*) is formed at the position of the upper guide 50 (or the lower guide 51) corresponding to the position of the wave, the inconvenience that the sheet P is brought into a paper jam at the position of the upper guide 50 (or the lower guide 51) can be easily reduced.

In Modification 6, the concaves 50*b* and 51*b* are formed in only one of the upper guide 50 and the lower guide 51. However, in a case where the direction of the wave portion Px formed in the sheet P is not determined, it is preferable that each of the upper guide 50 and the lower guide 51 has the concaves 50*b* and 51*b*.

As described above, the bypass sheet feeding device 15 (sheet conveying device) according to the present embodiment includes the sheet feed roller 17 (conveyor) that conveys the sheet P, and the upper guide 31 (guide member) that guides the sheet P conveyed by the sheet feed roller 17 toward downstream in the sheet conveyance direction. In other words, the upper guide 31 has the reference guide face 31*a* that extends in the sheet conveyance direction, and the concave 31*b* that is recessed in the retraction direction away from the sheet conveyance path with respect to the reference guide face 31*a*. The concave 31*b* has the edge portion 31*c* extending from the vertex 31*e* that is most recessed in the retraction direction and leading to the reference guide face 31*a* toward downstream in the sheet conveyance direction. Further, the concave 31*b* is inclined toward downstream in the sheet conveyance direction and is also inclined outward in the width direction that is orthogonal to the sheet conveyance direction within the plane of the reference guide face 31*a*, so that a pair of sloped faces 31*d* that is led to the reference guide face 31*a* is disposed to sandwich the edge portion 31*c*.

Further, even when a wave is generated at the leading end of the sheet P that is conveyed by the sheet feed roller 17 (conveyor), the inconvenience that the sheet P is brought to a paper jam at the position of the upper guide 31 (guide member) can be easily reduced.

The above-described embodiments of the present disclosure are applied to the bypass sheet feeding device 15 that is disposed to be exposed outside the image forming apparatus 1. However, the present disclosure is not limited to the above-described sheet conveying device (i.e., the bypass sheet feeding device 15). For example, the present disclosure is also applicable to a sheet feeding device as a sheet conveying device disposed inside the image forming apparatus 1, the document feeding device 10 (automatic document feeder) as a sheet conveying device, or a sheet conveying device disposed on the sheet conveyance path.

Further, the above-described embodiments of the present disclosure are applied to the bypass sheet feeding device 15 (sheet conveying device) disposed in a monochrome (black and white) image forming apparatus 1. However, the present disclosure is not limited to the above-described sheet conveying device. For example, the present disclosure is also applicable to a sheet conveying device disposed in a color image forming apparatus.

Further, the above-described embodiments of the present disclosure are applied to the bypass sheet feeding device 15 (sheet conveying device) disposed in the image forming apparatus 1 that employs electrophotography. However, the present disclosure is not limited to the above-described sheet conveying device. For example, the present disclosure is also applicable to a sheet conveying device disposed in an image forming apparatus that employs other technique such as an inkjet method or a stencil printing machine.

Further, the above-described embodiments of the present disclosure are applied to a sheet conveying device that employs the sheet separation pad 18 as a separator. However, the present disclosure is not limited to the above-described sheet conveying device. For example, a sheet separation roller may be employed as a separator.

Any of the cases described above exhibits substantially the same advantages as the advantages of the present embodiment.

The above-described embodiments and modifications are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited to the embodiments and thus may be preferably set to be applied to the present disclosure.

As described above, a "sheet" is not limited to indicate a regular paper material (sheet) but also includes other sheet-like materials such as coated paper, label paper, plastic material (e.g., OHP sheet) and fabric sheet. In addition, the "sheet" is not limited to a sheet or recording medium to be printed but is applicable to an original document to be fed in a sheet feeder such as an automatic document feeder.

The present disclosure may be applicable to, for example, a combination of the following aspects.

Aspect 1

In Aspect 1, a sheet conveying device includes a conveyor and a guide. The conveyor conveys a sheet. The guide guides the sheet conveyed by the conveyor, downstream in a sheet conveyance direction. The guide includes a reference guide face and a concave. The reference guide face extends along the sheet conveyance direction. The concave is recessed in a retraction direction extending away from a sheet conveyance path toward the reference guide face. The concave has an edge portion and an inclined face pair. The edge portion extends from a vertex that is most recessed in the retraction direction to the reference guide face downstream from the top portion in the retraction direction. The inclined face pair includes faces between which the top portion is located. The inclined face pair is inclined downstream in the sheet conveyance direction and outward in a width direction orthogonal to the sheet conveyance direction within a plane of the reference guide face, and extending toward the reference guide face.

Aspect 2

In Aspect 2, in the sheet conveying device according to Aspect 1, a position of the vertex in the width direction is substantially equal to a center position in the width direction of a wave portion generated in the sheet conveyed by the conveyor.

Aspect 3

In Aspect 3, in the sheet conveying device according to Aspect 1 or 2, a position of the vertex of the concave in the width direction is substantially equal to a center position in the width direction of the conveyor.

Aspect 4

In Aspect 4, the sheet conveying device according to Aspect 3 further includes multiple conveyors including the conveyor in the width direction. The guide includes multiple concaves, including the concave, corresponding to the multiple conveyors.

Aspect 5

In Aspect 5, the sheet conveying device according to Aspect 1 or 2 further includes multiple conveyors including the conveyor in the width direction. The concave of the guide is located according to a position between the multiple conveyors adjacent to each other.

Aspect 6

In Aspect 6, in the sheet conveying device according to any one of Aspects 1 to 5, the guide has a curved boundary between the reference guide face and the inclined face pair.

Aspect 7

In Aspect 7, in the sheet conveying device according to any one of Aspects 1 to 6, the edge portion of the guide has an angular shape.

Aspect 8

In Aspect 8, in the sheet conveying device according to any one of Aspects 1 to 6, the edge portion of the guide has a curved shape.

Aspect 9

In Aspect 9, in the sheet conveying device according to any one of Aspects 1 to 8, the inclined face pair of the guide is symmetrical with respect to the edge portion.

Aspect 10

In Aspect 10, in the sheet conveying device according to any one of Aspects 1 to 9, the guide further includes a second reference guide faces extending closer to the sheet conveyance direction than the reference guide face. The reference guide face is disposed between the second reference guide faces.

Aspect 11

In Aspect 11, in the sheet conveying device according to any one of Aspects 1 to 10, the conveyor includes a sheet roller and a separator in contact with the sheet roller, or a conveyance roller pair including two rollers.

Aspect 12

In Aspect 12, a sheet conveying device includes a conveyor and a guide. The conveyor conveys a sheet. The guide guides the sheet conveyed by the conveyor, downstream in a sheet conveyance direction. The guide includes a reference guide face and a concave. The reference guide face extends along the sheet conveyance direction. The concave is recessed in a retraction direction extending away from a sheet conveyance path toward the reference guide face. The concave has a top face and an inclined face pair. The vertex is most recessed in the retraction direction. The inclined face pair includes faces between which the vertex is located, and is inclined downstream in the sheet conveyance direction and outward in a width direction orthogonal to the sheet conveyance direction within a plane of the reference guide face, and extends toward the reference guide face.

Aspect 13

In Aspect 13, an image forming apparatus includes the sheet conveying device according to any one of Aspects 1 to 12.

Aspect 14

In Aspect 14, a sheet conveying device includes a conveyor and a guide. The conveyor conveys a sheet in a conveyance path in a conveyance direction. The guide guides the sheet conveyed by the conveyor in the conveyance direction. The guide has a reference guide face and a concave. The reference guide face extends along the conveyance direction. The concave is recessed away from the conveyance path with respect to the reference guide face in a retraction direction intersecting the conveyance direction. The concave has a vertex, an inner corner, and an incline face pair. The vertex is a most recessed portion in the concave in the retraction direction. The inner corner extends from the vertex to the reference guide face in the conveyance direction. The inclined face pair includes faces sandwiching the inner corner. The inclined face pair is inclined from the inner corner in the conveyance direction toward the reference guide face, and inclined outward in a width direction orthogonal to the conveyance direction and intersecting to the retraction direction with respect to a plane of the reference guide face, and connected to the reference guide face.

Aspect 15

In Aspect 15, in the sheet conveying device according to Aspect 14, the vertex is disposed at a center position, in the width direction, of a wave portion of the sheet generated in the sheet conveyed by the conveyor.

Aspect 16

In Aspect 16, in the sheet conveying device according to Aspect 14 or 15, a position of the vertex of the concave in the width direction is substantially equal to a center position in the width direction of the conveyor.

Aspect 17

In Aspect 17, the sheet conveying device according to Aspect 16 further includes multiple conveyors arranged in the width direction. The multiple conveyors include the conveyor. The guide includes multiple concaves corresponding to the multiple conveyors, the multiple concaves including the concave.

Aspect 18

In Aspect 18, the sheet conveying device according to Aspect 14 or 15 further includes multiple conveyors arranged in the width direction. The multiple conveyors include the conveyor. The guide includes multiple concaves including the concave. Each of the multiple concaves is disposed between two of the multiple conveyors adjacent to each other.

Aspect 19

In Aspect 19, in the sheet conveying device according to any one of Aspects 14 to 18, the guide has a curved portion between the reference guide face and the inclined face pair.

Aspect 20

In Aspect 20, in the sheet conveying device according to any one of Aspects 14 to 19, the inner corner of the guide has an angular shape.

Aspect 21

In Aspect 21, in the sheet conveying device according to any one of Aspects 14 to 19, the inner corner of the guide has a curved shape.

Aspect 22

In Aspect 22, in the sheet conveying device according to any one of Aspects 14 to 21, the inclined face pair of the guide is symmetrical with respect to the inner corner.

Aspect 23

In Aspect 23, in the sheet conveying device according to any one of Aspects 14 to 21, the inclined face pair of the guide is asymmetrical with respect to the inner corner.

Aspect 24

In Aspect 24, in the sheet conveying device according to any one of Aspects 14 to 22, wherein the guide further includes another reference guide faces extending closer to the conveyance direction than the reference guide face. The reference guide face is disposed between said another reference guide faces.

Aspect 25

In Aspect 25, in the sheet conveying device according to any one of Aspects 14 to 23, wherein the conveyor includes a sheet roller and a separator in contact with the sheet roller, or a conveyance roller pair including two rollers.

Aspect 26

In Aspect 26, in the sheet conveying device according to any one of Aspects 14 to 25, the concave has a triangular pyramid shape.

Aspect 27

In Aspect 27, an image forming apparatus includes the sheet conveying device according to any one of Aspects 14 to 27.

Aspect 28

In Aspect 28, a sheet conveying device includes a conveyor and a guide. The conveyor conveys a sheet in a conveyance path in a conveyance direction. The guide guides the sheet conveyed by the conveyor in the conveyance direction. The guide has a reference guide face and a concave. The reference guide face extends along the conveyance direction. The concave is recessed away from the conveyance path with respect to the reference guide face in a retraction direction intersecting the conveyance direction. The concave has a vertex and an incline face pair. The vertex is a most recessed portion in the concave in the retraction direction. The inclined face pair includes faces sandwiching the vertex. The inclined face pair is inclined in the conveyance direction, and inclined outward in a width direction orthogonal to the conveyance direction with respect to a plane of the reference guide face, and connected to the reference guide face.

Aspect 29

In Aspect 29, an image forming apparatus includes the sheet conveying device according to any one of Aspect 28.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet conveying device comprising:

a conveyor to convey a sheet in a conveyance path in a conveyance direction; and a guide to guide the sheet conveyed by the conveyor in the conveyance direction, the guide having:

a reference guide face extending along the conveyance direction; and a concave recessed away from the conveyance path with respect to the reference guide face in a retraction direction intersecting the conveyance direction, wherein the concave has:

a vertex that is a most recessed portion in the concave in the retraction direction;

an inner corner extending from the vertex to the reference guide face in the conveyance direction; and an inclined face pair including faces sandwiching the inner corner, and the inclined face pair is:

inclined from the inner corner in the conveyance direction toward the reference guide face; and inclined outward in a width direction orthogonal to the conveyance direction and intersecting to the retraction direction with respect to a plane of the reference guide face, and connected to the reference guide face.

2. The sheet conveying device according to claim 1, wherein the vertex is disposed at a center position, in the width direction, of a wave portion of the sheet generated in the sheet conveyed by the conveyor.

3. The sheet conveying device according to claim 1, wherein the vertex of the concave is disposed at a center position of the conveyor in the width direction.

4. The sheet conveying device according to claim 3, further comprising:
multiple conveyors arranged in the width direction, the multiple conveyors including the conveyor,
wherein the guide includes multiple concaves corresponding to the multiple conveyors, the multiple concaves including the concave.

5. The sheet conveying device according to claim 1, further comprising:
multiple conveyors arranged in the width direction, the multiple conveyors including the conveyor,
wherein the guide includes multiple concaves including the concave, and
each of the multiple concaves is disposed between two of the multiple conveyors adjacent to each other.

6. The sheet conveying device according to claim 1, wherein the guide has a curved portion between the reference guide face and the inclined face pair.

7. The sheet conveying device according to claim 1, wherein the inner corner of the guide has an angular shape.

8. The sheet conveying device according to claim 1, wherein the inner corner of the guide has a curved shape.

9. The sheet conveying device according to claim 1, wherein the inclined face pair of the guide is symmetrical with respect to the inner corner.

10. The sheet conveying device according to claim 1, wherein the inclined face pair of the guide is asymmetrical with respect to the inner corner.

11. The sheet conveying device according to claim 1, wherein the guide further includes another reference guide faces extending closer to the conveyance direction than the reference guide face, and
the reference guide face is disposed between said another reference guide faces.

12. The sheet conveying device according to claim 1, wherein the conveyor includes:
a sheet roller and a separator in contact with the sheet roller; or
a conveyance roller pair including two rollers.

13. The sheet conveying device according to claim 1, wherein the concave has a triangular pyramid shape.

14. An image forming apparatus comprising the sheet conveying device according to claim 1.

15. A sheet conveying device comprising:
a conveyor to convey a sheet in a conveyance path in a conveyance direction; and
a guide to guide the sheet conveyed by the conveyor in the conveyance direction, the guide having:
a reference guide face extending along the conveyance direction; and
a concave recessed away from the conveyance path with respect to the reference guide face in a retraction direction intersecting the conveyance direction,
wherein the concave has:
a vertex that is a most recessed portion in the concave in the retraction direction; and
an inclined face pair including faces sandwiching the vertex, and
the inclined face pair is:
inclined in the conveyance direction, and
inclined outward in a width direction orthogonal to the conveyance direction with respect to a plane of the reference guide face, and connected to the reference guide face.

16. An image forming apparatus comprising the sheet conveying device according to claim 15.

* * * * *